(12) United States Patent
Kojima et al.

(10) Patent No.: US 7,695,145 B2
(45) Date of Patent: Apr. 13, 2010

(54) PROJECTION-TYPE DISPLAY APPARATUS

(75) Inventors: Kuniko Kojima, Tokyo (JP); Hiroshi Kida, Tokyo (JP)

(73) Assignee: Mitsubishi Electric Corp, Tokyo (JP)

( * ) Notice: Subject to any disclaimer, the term of this patent is extended or adjusted under 35 U.S.C. 154(b) by 752 days.

(21) Appl. No.: 11/632,159

(22) PCT Filed: Mar. 30, 2006

(86) PCT No.: PCT/JP2006/306611

§ 371 (c)(1),
(2), (4) Date: Jan. 11, 2007

(87) PCT Pub. No.: WO2006/112245

PCT Pub. Date: Oct. 26, 2006

(65) Prior Publication Data

US 2008/0036973 A1    Feb. 14, 2008

(30) Foreign Application Priority Data

Apr. 15, 2005  (JP) .............................. 2005-117647
Jul. 26, 2005  (JP) .............................. 2005-215801

(51) Int. Cl.
*G03B 21/14* (2006.01)
*G03B 3/00* (2006.01)
*G02B 9/00* (2006.01)
*G02B 9/08* (2006.01)
*G02B 7/02* (2006.01)

(52) U.S. Cl. .......................... 353/101; 353/67; 353/97; 359/739; 359/813

(58) Field of Classification Search ............. 353/69–70, 353/75, 97, 99, 100–101, 122; 359/649–651, 359/694, 738–740, 813, 821–822, 827; 349/30, 349/113, 144, 176

See application file for complete search history.

(56) References Cited

U.S. PATENT DOCUMENTS

| 5,046,838 A | * | 9/1991 | Iwasaki ...................... 353/101 |
| 5,231,432 A | * | 7/1993 | Glenn ......................... 353/31 |
| 5,371,559 A | * | 12/1994 | San-Nohe et al. ............. 353/31 |

(Continued)

FOREIGN PATENT DOCUMENTS

JP    09-133974 A    5/1997

(Continued)

*Primary Examiner*—Georgia Y Epps
*Assistant Examiner*—Jori S Byrne-Diakun
(74) *Attorney, Agent, or Firm*—Birch, Stewart, Kolasch & Birch, LLP

(57) ABSTRACT

A projection-type display apparatus includes an illumination optical system (1) including a light source, a reflection-type light valve (2) having an image forming area on a to-be-illuminated surface illuminated by the illumination optical system (1), and a projection optical system (3) that projects an image formed on the image forming area of the reflection-type light valve (2). The projection optical system (1) is shiftable in a direction approximately perpendicular to a projection optical axis. An F-number of the projection optical system (3) is smaller than an F-number of the illumination optical system (1). Between the projection optical system (3) and the reflection-type light valve (2), an opening defining member (12) that defines an incident side opening of the projection optical system (3) is provided, which is not moved by the shifting of the projection optical system (3).

14 Claims, 9 Drawing Sheets

U.S. PATENT DOCUMENTS

| | | | |
|---|---|---|---|
| 5,743,612 A * | 4/1998 | Matsuda et al. | 353/97 |
| 6,382,799 B1 * | 5/2002 | Nishikawa et al. | 353/122 |
| 6,471,359 B1 * | 10/2002 | Kim et al. | 353/122 |
| 6,587,159 B1 * | 7/2003 | Dewald | 348/744 |
| 6,633,436 B2 * | 10/2003 | Wada et al. | 359/681 |
| 6,773,120 B2 * | 8/2004 | Colpaert | 353/122 |
| 6,783,249 B2 * | 8/2004 | Yoneyama | 353/98 |
| 7,021,772 B2 * | 4/2006 | Abe et al. | 353/97 |
| 7,204,598 B2 * | 4/2007 | Kuroda et al. | 353/101 |
| 7,296,902 B2 * | 11/2007 | Gilbert et al. | 353/122 |
| 2007/0002466 A1 * | 1/2007 | Kobayashi et al. | 359/740 |
| 2007/0013880 A1 * | 1/2007 | Fushimi et al. | 353/102 |

FOREIGN PATENT DOCUMENTS

| | | |
|---|---|---|
| JP | 11-327043 A | 11/1999 |
| JP | 2001-42256 A | 2/2001 |
| JP | 2003-075768 A | 3/2003 |
| JP | 2003-185964 A | 7/2003 |
| JP | 2003-248169 A | 9/2003 |
| JP | 2004-029043 A | 1/2004 |

* cited by examiner

PROJECTION-TYPE DISPLAY APPARATUS

TECHNICAL FIELD

This invention relates to a projection-type display apparatus that projects an image on a screen. In particular, this invention relates to a projection-type display apparatus using a reflection-type light valve such as a digital micro-mirror device (hereinafter, referred to as DMD), a reflection-type liquid crystal display device or the like.

BACKGROUND ART

An optical system of the projection-type display apparatus using a reflection-type light valve is classified broadly into two types: a telecentric type and a non-telecentric type. The telecentric optical system uses a prism so that a projection lens is telecentric with respect to a reflection-type light valve. The non-telecentric type optical system does not use a prism, and is so configured that the projection lens is not telecentric with respect to the reflection-type light valve.

Recently, there is proposed a projection-type display apparatus having a function to shift a projection lens in a vertical direction or the like (i.e., a lens shift function), so as to arbitrarily move a projection area without moving a main body of the apparatus. In order to accomplish such a lens shift function, it is proposed to employ a telecentric optical system using a total reflection prism (for example, see Patent Document 1).

In contrast, there is proposed an optical system using a condenser lens that introduces the light from a light source to the DMD and a projection lens that projects the light reflected by the DMD, and is configured to change the angle of incidence on the DMD by decentering the condenser lens in accordance with the movement (shifting) of the projection lens (for example, see Patent Document 2).

Patent Document 1: Japanese Laid-Open Patent Publication No. 2001-42256 (Pages 4-5, FIG. 3).

Patent Document 2: Japanese Laid-Open Patent Publication No. 2003-75768 (Pages 3-4, FIG. 1).

DISCLOSURE OF THE INVENTION

Problems to be Solved by the Invention

However, in the case where the telecentric optical system using the prism is employed for accomplishing the lens shift function as disclosed in Patent Document 1, there is a problem that a light use efficiency decreases due to the reflection at surface boundaries of the prism. Further, there is a problem that the luminance and contrast of a projected image decrease because the light reflected by the boundary surfaces of the prism becomes stray light. Further, there is a problem that the provision of the prism increases the cost of the projection-type display device.

In contrast, in the case where the non-telecentric optical system is employed for accomplishing the lens shift function as disclosed in Patent Document 2, the condenser lens is decentered in accordance with the movement of the projection lens, and therefore the number of moving parts increases. As a result, there is a problem that the projection-type display apparatus becomes large, and the cost of the projection-type display apparatus increases.

The present invention is intended to solve the above described problems, and an object of the present invention is to provide a projection-type display apparatus employing a non-telecentric optical system, accomplishing a lens shift function without decentering a condenser lens of an illumination optical system, having high luminance and contrast of a projected image, being small in size, and being low in price.

Means of Solving the Problems

An illumination optical system according to the present invention includes a light source, a reflection-type light valve having an image forming area on a to-be-illuminated surface illuminated by said illumination optical system, a projection optical system that projects an image formed on said image forming area of said reflection-type light valve, said projection optical system being shiftable in a direction approximately perpendicular to a projection optical axis. An F-number of said projection optical system is smaller than an F-number of said illumination optical system. Further, an opening defining member is provided between said projection optical system and said reflection-type light valve, said opening defining member being a member not moved by the shifting of said projection optical system, and said opening defining member defining an incident side opening of said projection optical system.

EFFECT OF THE INVENTION

According to the present invention, because of the configuration in which the F-number of the projection optical system is smaller than the F-number of the illumination optical system and the opening defining member (fixed) is provided between the projection optical system and the reflection-type light valve, the lens shift function can be accomplished using the non-telecentric optical system without decentering the condenser lens. That is, the lens shift function can be accomplished without causing the increase in the size and the cost of the projection-type display apparatus.

Further, in this invention, since the opening defining member that defines the incident side opening is provided between the reflection-type light valve and the projection optical system, it becomes possible to prevent the unnecessary light from reaching the screen when the projection optical system is moved, and therefore an excellent contrast can be obtained.

Moreover, in this invention, it is not necessary to use the telecentric optical system using a prism, and therefore it becomes possible to provide a projection-type display apparatus having a high light use efficiency and excellent contrast, and which is low in cost.

Additionally, with the configuration in which a shifting amount $S_p$ in the direction approximately perpendicular to the projection optical system, a diameter E of the incident side opening of the opening defining member, an effective diameter $E_p$ of an incident surface of the projection optical system, and a dimension $V_d$ of the reflection-type light valve in the vertical scanning direction satisfy:

$$E < E_p,$$

$$0.7 \times V_d > S_p > 0.4 \times V_d,$$

it becomes possible to accomplish an excellent lens shift function using the non-telecentric optical system only by shifting the projection optical system in the direction approximately perpendicular to the projection optical axis without decentering an optical component constituting the projection optical system. As a result, it becomes possible to prevent the increase in the size and cost of the apparatus.

DESCRIPTION OF REFERENCE MARKS

1 . . . illumination optical system, $1a$ . . . optical axis of illumination optical system, $2a$ . . . DMD element (reflection-type light valve), $2b$ . . . to-be-illuminated surface of DMD element, 3 . . . projection optical system, $3a$ . . . projection optical axis of projection optical system, $3d$ . . . incident surface of projection optical system, 4 . . . lamp, 5 . . . color filter, 6 . . . light intensity uniformizing element, 7 . . . relay lens group, 8 . . . first mirror, 9 . . . second mirror, 10 . . . incident side opening, 12 . . . aperture member (opening defining member), 100 . . . screen, $D_H$ . . . horizontal direction (horizontal scanning direction of DMD element), $D_V$ . . . vertical direction (vertical scanning direction of DMD element), E . . . diameter of incident side opening of the aperture member, $E_P$ . . . effective diameter of incident surface of projection optical system, $F_I$ . . . F-number of illumination optical system, $F_P$ . . . F-number of projection optical system, L . . . distance between aperture member and DMD element, $S_P$ . . . shifting amount of projection optical system, and $V_d$ . . . dimension of DMD element in direction of short axis.

BEST MODE FOR CARRYING OUT THE INVENTION

Embodiment 1

Figure 1:
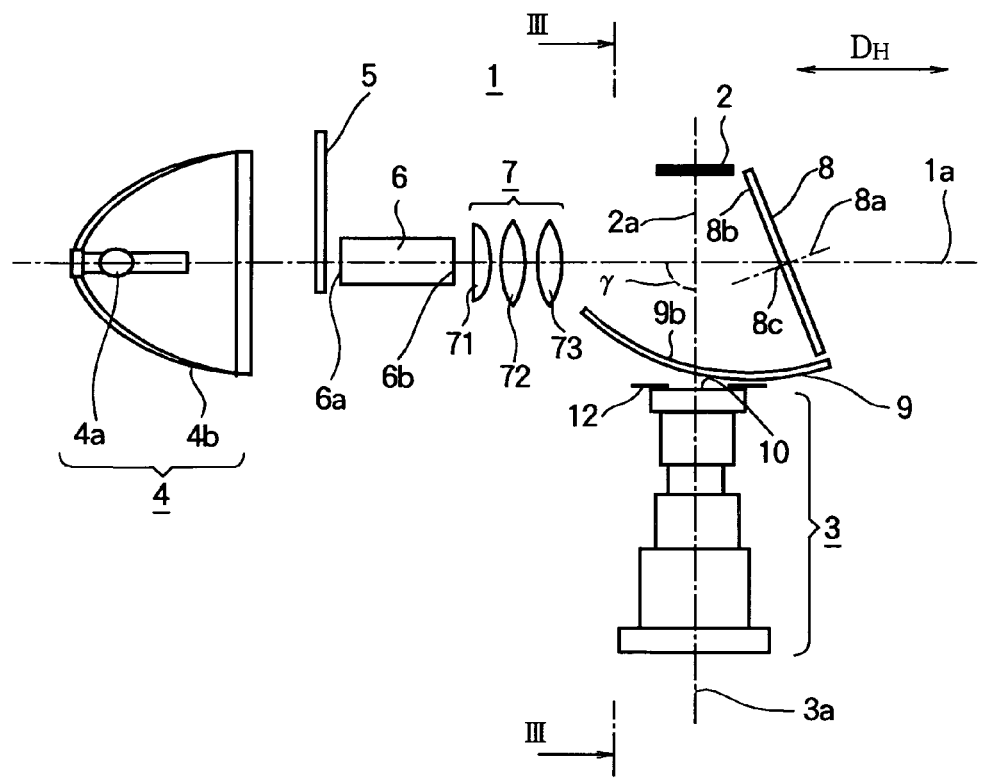
FIG. 1 is a plan view showing a basic configuration of a projection-type display apparatus according to Embodiment 1 of the present invention.

FIG. 1 is a plan view showing a basic configuration of a projection-type display apparatus according to Embodiment 1 of the present invention. An arrangement of the respective components of the projection-type display apparatus shown in FIG. 1 is as seen from above in the practical use of the projection-type display apparatus, i.e., an arrangement in top view.

The projection-type display apparatus according to Embodiment 1 includes a DMD element 2 as a reflection-type light valve, an illumination optical system 1 that illuminates the DMD element 2, and a projection optical system 3 that projects an image on the DMD element 2 (illuminated by the illumination optical system 1) on a not shown screen.

The illumination optical system 1 includes a light source lamp 4, a rotary color filter 5 that transmits the light flux of a specific wavelength range among the light flux emitted by the light source lamp 4, a light intensity uniformizing element 6 that uniformizes the light intensity of the light flux having passed through the rotary color filter 5 on a cross section of the light flux, a relay lens group 7 that relays the light flux emitted by the light intensity uniformizing element 6 in the proceeding direction of the light flux, a first mirror 8 and a second mirror 9 that reflect the light flux relayed by the relay lens group 7 toward the DMD element 2.

The light source lamp 4 is constructed by, for example, a luminous body $4a$ that emits white light and an ellipsoidal mirror $4b$ provided around the luminous body $4a$. The ellipsoidal mirror $4b$ reflects a light flux emitted from a primary focus corresponding to a primary center of the ellipse, and focuses the light flux to a secondary focus corresponding to a secondary center of the ellipse. The luminous body $4a$ is disposed in the vicinity of the first focus of the ellipsoidal mirror $4b$, and the light flux emitted by the luminous body $4a$ is focused on the vicinity of the secondary focus of the ellipsoidal mirror $4b$. An optical axis $1a$ of the illumination optical system 1 is defined by a line passing through the primary focus and the secondary focus of the ellipsoidal mirror $4b$.

The light source lamp 4 is not limited to the configuration shown in FIG. 1. It is also possible to use a parabolic mirror, instead of the ellipsoidal mirror $4b$. In this case, the light flux emitted by the luminous body $4a$ can be approximately collimated by the parabolic mirror, and then focused by a condenser lens.

The rotary color filter 5 is a disk-shaped member divided into, for example, three fan-like sections that constitute filter regions of red, green and blue. The three filter regions of red, green and blue respectively transmit the light flux corresponding to respective wavelength ranges of red, green and blue colors. The rotary color filter 5 rotates about an axis approximately parallel to the optical axis $1a$ of the illumination optical system 1, and the rotary color filter 5 is so configured that the respective filter regions expand in the direction perpendicular to the optical axis $1a$ of the illumination optical system 1 and are disposed in the vicinity of the secondary focus of the ellipsoidal mirror 4b. By rotating the rotary color filter 5 in synchronization with the image signal, the red light, green light and blue light irradiate the DMD element 2 sequentially (in field-sequential manner).

The light intensity uniformizing element 6 uniformizes the distribution of the intensity of the light flux in the cross section of the light flux having passed through the rotary color filter 5 (i.e., reduces the unevenness of the illumination intensity). As an example of the light intensity uniformizing element 6, a rod in the form of a rectangular column formed of transparent glass or plastic, or a pipe formed by combining surface mirrors with reflection surfaces directed inwardly are generally known. The former reflects the light a plurality of times by means of total reflex action at boundary surfaces between the transparent material and the air. The latter reflects the light a plurality of times by means of reflex action at the surface mirrors. This behavior of the light is approximately the same as that of kaleidoscope. If the appropriate length is taken, the lights having been reflected a plurality of times in the light intensity uniformizing element 6 irradiate the vicinity of an exit surface 6b of the light intensity uniformizing element 6 in an overlapping manner, so that approximately a uniform distribution of the light intensity is obtained in the vicinity of an exit surface 6b of the light intensity uniformizing element 6. The light flux having the approximately uniform distribution of intensity is introduced to the DMD element 2 by the relay lens group 7, the first mirror 8 and the second mirror 9 described later, and irradiate the DMD element 2. As an example of the light intensity uniformizing element 6, it is also possible to use other optical element such as, for example, a lens array in which a plurality of lens elements are arranged in a plane.

Figure 2:
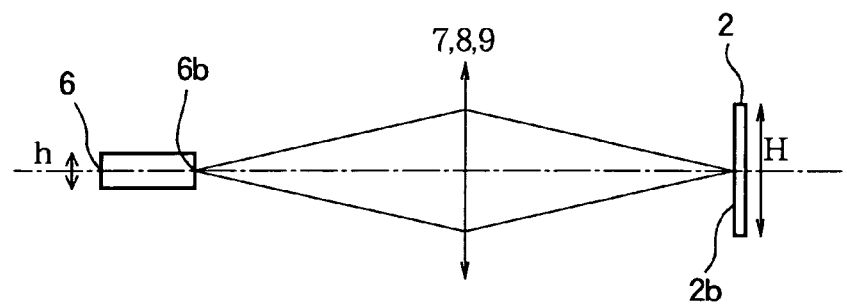
FIG. 2 is a view schematically showing the relationship between a light intensity uniformizing element and a DMD element of the projection-type display apparatus according to Embodiment 1 of the present invention.

FIG. 2 is a view schematically showing a state of convergence of the light flux emitted by the exit surface 6b of the light intensity uniformizing element 6. The relay lens group 7, the first mirror 8 and the second mirror 9 are so configured that the exit surface 6b of the light intensity uniformizing element 6 and a to-be-illuminated surface 2b of the DMD element 2 have an optically conjugate relationship. The diagonal dimension of the exit surface 6b of the light intensity uniformizing element 6 is referred to as "h", and the diagonal dimension of the to-be-illuminated surface 2b of the DMD element 2 is referred to as "H". The integrated magnitude M of the relay lens group 7, the first mirror 8 and the second mirror 9 is designed to be approximately the same as H/h.

The relay lens group 7 is composed of one or a plurality of lenses. In an example shown in FIG. 1, the relay lens group 7 is composed of three lenses 71, 72 and 73.

The DMD element 2 is constructed by arranging a large number of (for example, several hundreds of thousand of) movable micro-mirrors corresponding to respective pixels arranged in a plane, and is configured to vary tilt angles of the respective micro-mirrors in accordance with image information. The plane in which the micro-mirrors are arranged is referred to as a base plane. The DMD element 2 tilts the micro-mirror at an angle α (for example, 12 degrees) with respect to the base plane in a predetermined direction, so as to reflect the incident light toward the projection optical system 3. Further, the DMD element 2 tilts the micro-mirror at the angle α with respect to the base plane in the opposite direction, so as to reflect the incident light toward a light absorption plate (not shown) disposed on a position remote from the projection optical system 3. A general structure of the DMD element is disclosed in, for example, a document, L. H. Hornbeck "Digital Light Processing for high-brightness, high resolution applications", Prog. SPIE, Vol. 3013, pp. 27-40, 1997. The region of the DMD element 2 in which the large number of micro-mirrors are arranged corresponds to an image forming area illuminated by the illumination optical system 1 to form an image.

Figure 3:
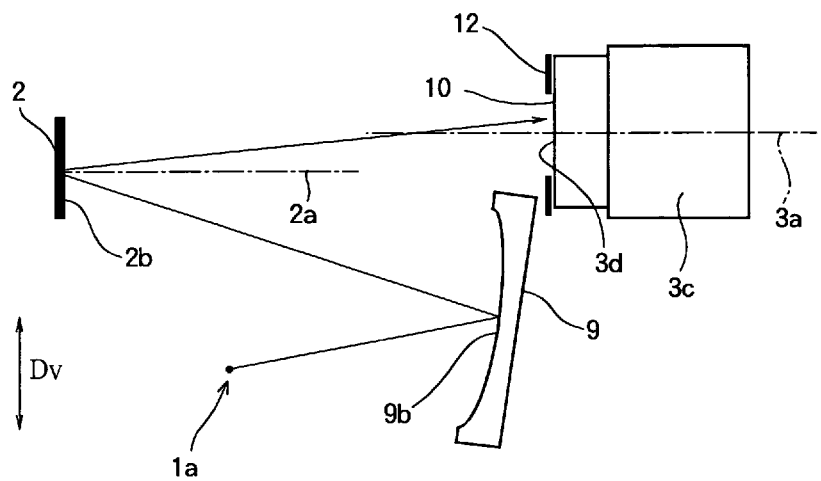
FIG. 3 is a side view of the projection-type display apparatus shown in FIG. 1 as seen in the direction of arrows on a surface indicated by a line III-III.

FIG. 3 is a view of the projection-type display apparatus according to Embodiment 1, as seen in a direction indicated by arrows along a plane indicated by a line III-III shown in FIG. 1 (i.e., as seen from the illumination optical system 1 side). As shown in FIG. 3, the DMD element 2 is disposed on a position shifted from the optical axis 1a (in FIG. 3, the position above the optical axis 1a, i.e., in a direction parallel to the vertical scanning direction of the DMD element 2). The projection optical system 3 includes a not shown lens group provided in a lens barrel 3c, and an incident surface 3d thereof is provided in opposition to approximately the front of the DMD element 2. An optical axis 3a of the lens group of the projection optical system 3 is parallel to a normal line 2a passing through the center of the to-be-illuminated surface 2b of the DMD element 2, and is shifted a predetermined amount from the normal line 2a.

The first mirror 8 has a reflection surface 8b, and a normal line 8a passing through the reflection surface 8b of the first mirror 8 is inclined with respect to the optical axis 1a as shown in FIG. 1. With such a configuration, the reflection surface 8b of the first mirror 8 reflects the light flux (incident from the relay lens group 7) to the second mirror 9. The first mirror 8 acts to determine the shape of the illumination light flux that illuminates the DMD element 2 and the suitable illumination position, and is composed of a plane mirror or a concave reflection mirror. If the first mirror 8 is composed of a plane mirror, the effect to suitably determine the shape of the illumination light flux illuminating the DMD element 2 becomes weaker. However, the first mirror 8 can be constructed in the most inexpensive manner, and the interference with the DMD element 2 and the second mirror 9 can be easily avoided since the thickness of the first mirror 8 can be the thinnest. If the reflection surface of the first mirror 8 is a cylindrical concave surface, it becomes possible to suitably compensate the distortion aberration (due to oblique incidence on the DMD element 2), and to accomplish the suitable shape of the illumination light flux and the suitable illuminating position. On the reflection mirror 8b of the first mirror 8 shown in FIG. 1, the position to which the light emitted from the center of the exit surface 6b of the light intensity uniformizing element 6 reaches is indicated by numeral 8c.

As shown in FIG. 3, the second mirror 9 is disposed below (i.e., the lower side in FIG. 3) and adjacent to the projection optical system 3. In order not to interfere with the second mirror 9 when the projection optical system 3 moves for the lens shift described later, the second mirror 9 is disposed on the DMD element 2 side with respect to the lens barrel 3c of the projection optical system 3 (in the direction of the projection optical axis 3a). The light flux reflected by the reflection surface 9b is reflected by the to-be-illuminated surface 2b of the DMD element 2, and is incident on an incident side opening 10 of the projection optical system 3.

As shown in FIG. 1, the light ray proceeding through the center of the light flux from the DMD element 2 to the projection optical system 3 is approximately perpendicular to the light ray (the optical axis 1a) proceeding through the center of the light flux from the light source lamp 4 to the first mirror 8, as seen from above. Further, the normal line 2a of the to-be-illuminated surface 2b of the DMD element 2 and the optical axis 3a of the projection optical system 3 are approximately perpendicular to the optical axis 1a as seen from above.

If the angle is far from the above described approximately perpendicular, it becomes difficult to dispose the light source lamp 4, the relay lens group 7, the first mirror 8, the second mirror 9, the reflection-type light bulb 2 and the projection optical system 3, without interfering the respective optical axes. Further, the allowable range of the tilt angle of the light source lamp 4 is approximately 15 degrees. If the tilt angle of the light source lamp 4 is larger, the brightness decreases and the flicker of the light source lamp 4 occurs, so that it becomes difficult to obtain a suitable image. For these reasons, the angle γ (FIG. 1) at which the optical axis 1a of the illumination optical system 1 crosses the normal line 2a of the to-be-illuminated surface 2b of the DMD element 2 and the projection optical axis 3a of the projection optical system 3 is preferably in the range of 90±5 degrees.

Figure 4A:
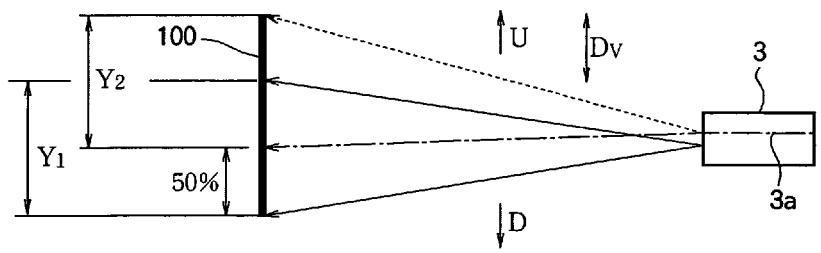
FIGS. 4(A) and 4(B) are views schematically showing a lens shift function in Embodiment 1 of the present invention.
Figure 4B:
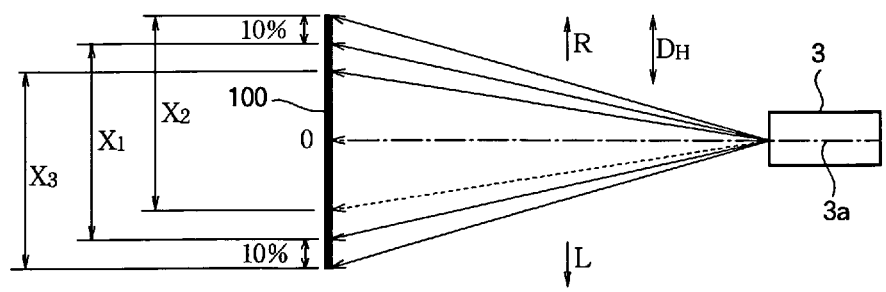

FIGS. 4(A) and 4(B) are views for illustrating the lens shift function. The lens shift function is a function to move (i.e., shift) the projection optical system 3 in the direction approximately perpendicular to the projection optical axis 3a (here, the vertical direction (the vertical scanning direction of the DMD element 2, and the direction $D_V$ in FIG. 3) and/or the horizontal direction (the horizontal scanning direction of the DMD element 2, and the direction $D_H$ in FIG. 1)), so as to arbitrarily move the projection area. FIG. 4(A) is a side view showing the projection optical system 3 and the screen 100 as seen from the side. FIG. 4(B) is a plan view showing the projection optical system 3 and the screen 100 as seen from above. When the projection optical system 3 moves in the vertical direction, the projection area on the screen 100 moves upward (arrow U) or downward (arrow D) as shown in FIG. 4(A). Further, when the projection optical system 3 moves in the horizontal direction, the projection area on the screen 100 moves to the left (arrow L) and to the right (arrow R) as shown in FIG. 4(B).

In FIG. 4(A), when the projection optical system 3 is at a first position (lower position) in the vertical direction, the image is projected on an area indicated by mark $Y_1$ on the screen 100. In this state, the vertical position of the projection optical axis 3a of the projection optical system 3 is aligned with the center position of the projection area $Y_1$ in the vertical direction. In this state, the shifting amount of the projection optical system 3 is defined to be 0%.

In contrast, when the projection optical system 3 is at a second position (upper position) in the vertical direction, the image is projected on an area indicated by mark $Y_2$ on the screen 100. The vertical position of the projection optical axis 3a of the projection optical system 3 is aligned with the lower end of the projection area $Y_2$. The projection area $Y_2$ is shifted upward with respect to the projection area $Y_1$ by 50% of the projection width (in the direction of short axis). Therefore, in this state, the shifting amount of the projection optical system 3 is defined to be 50%. In a state where the shifting amount of the projection optical system 3 is 50%, the image is projected upward on the screen 100 from the projection optical system 3. The shifting amount (moving amount) of the projection optical system 3 itself is small compared with the moving amount of the projection area, and therefore omitted in FIG. 4(A).

In FIG. 4(B), when the projection optical system 3 is at a first position (center position) in the horizontal direction, the image is projected on an area indicated by mark $X_1$ on the screen 100. In this state, the horizontal position of the projection optical axis 3a of the projection optical system 3 is aligned with the center position of the projection area $X_1$ in the horizontal direction. In this state, the shifting amount of the projection optical system 3 is defined to be 0%.

Further, when the projection optical system 3 is at a second position (right end position) in the horizontal direction, the image is projected on an area indicated by mark $X_2$ on the screen 100. The projection area $X_2$ is shifted to the right with respect to the projection area $X_1$ by 10% of the projection width (in the direction of longer axis). Therefore, in this state, the shifting amount of the projection optical system 3 is defined to be 10%. Similarly, when the projection optical system 3 is at a third position (left end position) in the horizontal direction, the image is projected on an area indicated by mark $X_3$ on the screen 100. The projection area $X_3$ is shifted to the left with respect to the projection area $X_1$ by 10% of the projection width. Therefore, in this state, the shifting amount of the projection optical system 3 is defined to be −10%.

The shifting amounts of the projection optical system 3 in the vertical and horizontal directions depend on the configuration of the projection optical system 3, and are not limited to the ranges shown in FIGS. 4A and 4B.

In order to accomplish the lens shift function shown in FIGS. 4A and 4B, it is necessary to design the image circle 11 of the projection optical system 3 to have a size corresponding to the shifting amount. Here, the rectangular DMD element 2 has a dimension Hd of 14.01 mm in the horizontal direction (the direction of longer axis, i.e., the direction of longer sides), and a dimension Vd of 10.51 mm in the vertical direction (the direction of shorter axis, i.e., the direction of shorter sides). The shifting amount in the vertical direction is 50%, and the shifting amount in the horizontal direction is ±10%. The size of the image circle 11 on this condition is shown in FIGS. 5(A) through 5(C).

Figure 5:
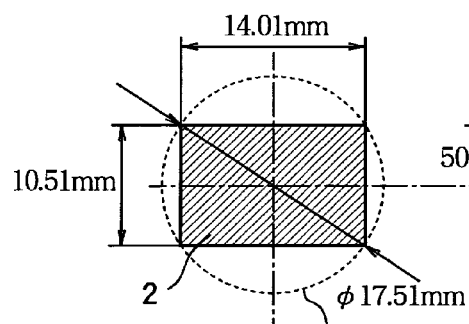
FIGS. 5(A) through 5(C) are views schematically showing an image circle of a projection optical system of Embodiment 1 of the present invention.
Figure 5:
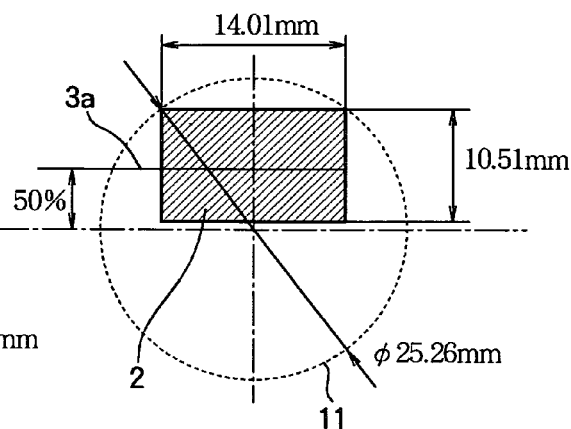
Figure 5:
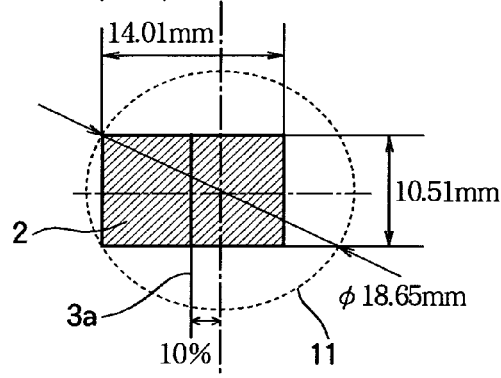

FIG. 5(A) shows the image circle 11 when both of the shifting amounts of the projection optical system 3 in the horizontal and vertical directions are 0%. In this case, the image circle 11 of the projection optical system 3 is a circle having a diameter of 17.51 mm.

FIG. 5(B) shows the image circle 11 when the shifting amount of the projection optical system 3 in the vertical direction is 50% and the shifting amount in the horizontal direction is 0%. In this case, the center of the image circle 11 is at a position shifted from the center of the DMD element 2 in the vertical direction by the shifting amount (50%), and therefore the image circle 11 is a circle having a diameter of 25.26 mm.

FIG. 5(C) shows the image circle 11 when the shifting amount of the projection optical system 3 in the vertical direction is 0% and the shifting amount in the horizontal direction is 10%. In this case, the center of the image circle 11 is at a position shifted from the center of the DMD element 2 in the horizontal direction by the shifting amount (10%), and therefore the image circle 11 is a circle having a diameter of 18.65 mm. FIG. 5(C) shows an example in which the projection optical system 3 is shifted to one side in the horizontal direction (left side). However, even when the projection optical system 3 is shifted to the other side in the horizontal direction (right side), the DMD element 2 is included in the image circle 11 having a diameter of 18.65 mm as shown in FIG. 5(C).

FIGS. 5(B) and 5(C) show examples in which projection optical system 3 is shifted only in the vertical direction and only in the horizontal direction. However, by appropriately determining the image circle 11, it is possible to display the image while shifting the projection optical system 3 in both of the vertical and horizontal directions. Here, the diameter of the image circle 11 is set to 25.26 mm as shown in FIG. 5(B).

Figure 6:
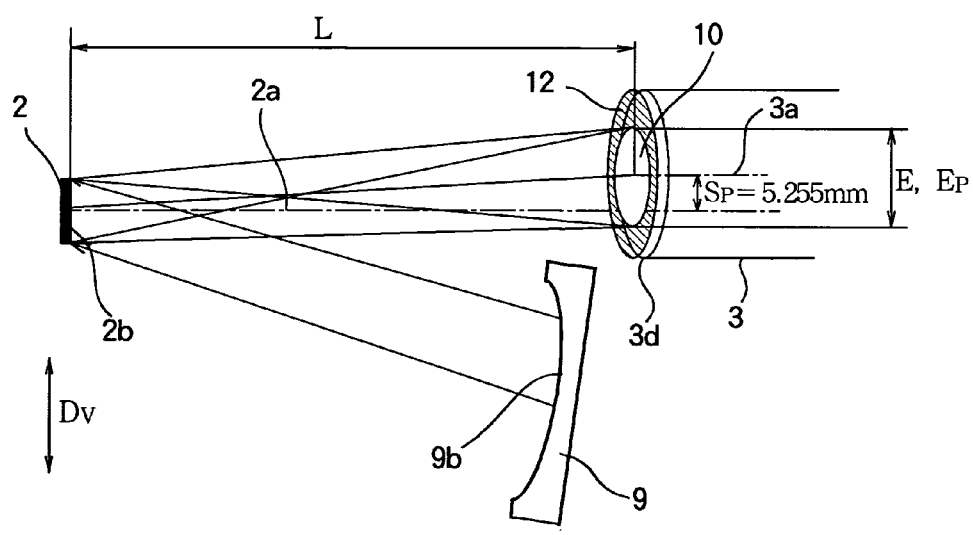
FIG. 6 is a view schematically showing an arrangement of the projection optical system shifted in the vertical direction in Embodiment 1 of the present invention.

The configuration of the illumination optical system 1 and the projection optical system 3 in Embodiment 1 will be described. As described above, the diameter of the image circle 11 of the projection optical system 3 is set to 25.26 mm. Therefore, if the shifting is performed only in the vertical direction, the projection optical system 3 is able shift up to the shifting amount of 50% (FIG. 5B). FIG. 6 shows the light path when the shifting amount of the projection optical system 3 in the vertical direction is 50%.

As shown in FIG. 6, an aperture member (an opening defining member) 12 defining an incident side opening 10 of the projection optical system 3 is disposed on slightly DMD element 2 side with respect to the incident surface 3d of the projection optical system 3. The incident side opening 10 of the aperture member 12 has a circular shape having the diameter E, and the surrounding portion around the incident side opening 10 is coated with black coating or the like for shielding against the unnecessary light. The shifting amount of the projection optical system 3 in the vertical direction is 50%, and therefore the projection optical axis 3a of the projection optical system 3 is at a position shifted from the normal line 2a passing through the center of the to-be-illuminated surface 2b of the DMD element 2 in the vertical direction, i.e., the direction of shorter axis of the DMD element 2, by 50% (i.e., 5.255 mm). The center of the incident side opening 10 defined by the aperture member 12 is on a position shifted from the normal line 2a of the DMD element 2 in the vertical direction by 50% (i.e., 5.255 mm).

The light flux from the illumination optical system 1 (the light flux reflected by the second reflection mirror 9 of the illumination optical system 1) is reflected by the to-be-illuminated surface 2b of the DMD element 2, proceeds through the incident side opening 10 of the projection optical system 3, and is incident on the projection optical system 3. The distance from the to-be-illuminated surface 2b of the DMD element 2 to the incident side opening 10 of the projection optical system 3 is referred to as L. The diameter of the incident side opening 10 is referred to as E. As the widening of the light flux of the illumination optical system 1 is designed in accordance with the diameter E of the incident side opening 10, an F-number $F_I$ of the illumination optical system 1 is calculated by the following equation (1):

$$F_I = 1/(2 \times \sin(\tan^{-1}(E/2 \times L))) \quad (1)$$

The brightness of the illumination optical system 1 is determined by the F-number $F_I$ of the illumination optical system.

In contrast, the projection optical system 3 is needed to have a size sufficient for taking in the light flux having passed through the incident side opening 10 of the projection optical system 3. The incident surface 3d of the projection optical system 3 and the incident side opening 10 are disposed close to each other. Therefore, if the projection optical axis 3a and the center of the incident side opening 10 of the projection optical system 3 are aligned with each other as shown in FIG. 6, it is only necessary that the effective diameter $E_P$ of the incident surface 3d of the projection optical system 3 is approximately the same as or slightly larger than the diameter E of the incident side opening 10. This means that the F-number $F_P$ of the projection optical system 3 can be approximately the same as or slightly smaller than the F-number $F_I$ of the illumination optical system 1, i.e., the bright illumination optical system 1 can be configured.

Figure 7:
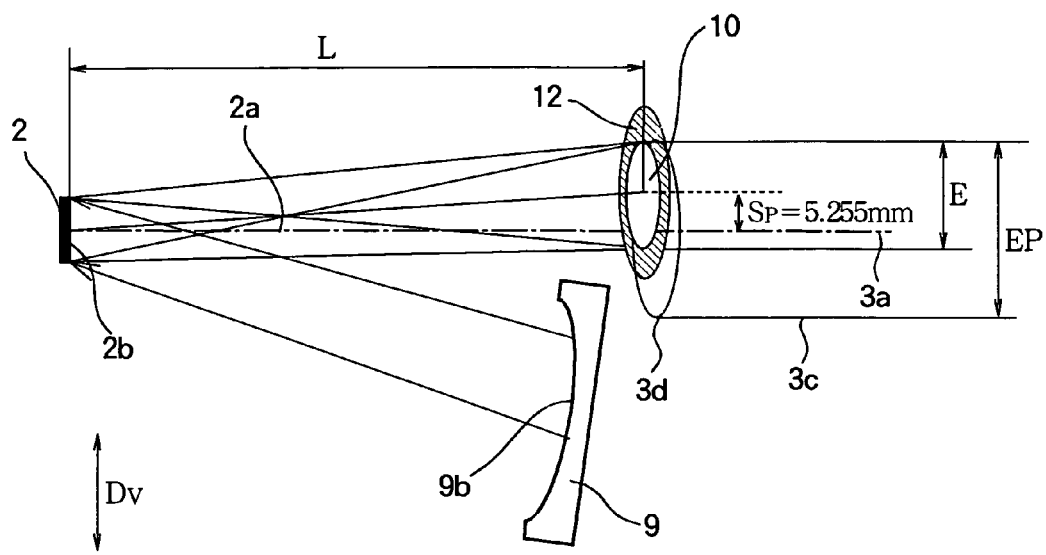
FIG. 7 is a view schematically showing an arrangement of the projection optical system shifted in the vertical direction in Embodiment 1 of the present invention.

FIG. 7 shows a state where the shifting amount of the projection optical system 3 in the vertical direction (direction $D_V$) is 0%. As shown in FIG. 7, even when the projection optical system 3 shifts (here, shifts downward), the components other than the projection optical system 3 (the illumination optical system 1, the DMD element 2 and the aperture member 12 defining the incident side opening 10) do not move. The light flux from the illumination optical system 1 is reflected by the to-be-illuminated surface 2b of the DMD element 2 and reaches the incident side opening 10 of the projection optical system 3 having the center at a position shifted from the normal line 2a (passing through the center of the DMD element 2) by 5.255 mm (=10.51 mm×50%). In order to take in all the light flux having passed through the incident side opening 10, it is necessary to set the effective diameter $E_P$ of the incident surface 3d of the projection optical system 3 larger than the diameter E of the incident side opening 10 by an amount corresponding to double the shifting amount $S_P$ (double 5.255 mm in FIG. 7).

Here, the description will be made to the case where the F-number $F_I$ of the illumination system 1 is set to 2.4. When the F-number $F_I$ of the illumination system 1 is set to 2.4, and the distance L from the to-be-illuminated surface 2b of the DMD element 2 to the incident side opening 10 of the projection optical system 3 is set to 47.5 mm, the diameter E of the incident side opening 10 is calculated using the above described equation (1) as follows:

$$E = (2 \times 47.5) \times \tan(\sin^{-1}(1/(2 \times 2.4))) \approx 20.2$$

and the result is approximately 20.2 mm. When the F-number $F_I$ of the illumination optical system 1 is 2.4, and when the shifting amount of the projection optical system 3 is 50% as shown in FIG. 6, it is possible to effectively take in the light flux from the illumination optical system 1 if the effective diameter $E_P$ of the incident surface 3d of the projection optical system 3 has the size approximately the same as 20.2 mm. In this state, since the incident side opening 10 and the incident surface 3d of the projection optical system 3 are disposed close to each other, the distance from the to-be-illuminated surface 2b of the DMD element 2 to the incident surface 3d is approximately the same as L. Therefore, it is possible to take in the light flux having passed through the incident side opening 10, by setting the F-number $F_P$ of the projection optical system 3 to 2.4 which is the same as the F-number $F_I$ of the irradiation optical system 1, or to a value (for example, 2.35) slightly smaller than 2.4.

Similarly, as shown in FIG. 7, if the shifting amount $S_P$ of the projection optical system 3 is 0%, the diameter E of the incident side opening 10 is 20.2 mm. However, the effective diameter $E_P$ of the incident surface 3d of the projection optical system 3 is larger by double 5.255 mm (i.e., 10.51 mm), and is 30.71 mm (20.2 mm+10.51 mm). The F-number $F_P$ of the projection optical system 3 can be calculated as follows:

$$F_P = 1/(2 \times \sin(\tan^{-1}(E_P/2 \times L))) \quad (2)$$

$$\text{Here, } E_P = E + 2 \times S_P \quad (3)$$

Based on the equations (2) and (3), the F-number $F_P$ can be calculated according to the following equation (4):

$$F_P = 1/(2 \times \sin(\tan^{-1}((E + 2 \times S_P)/2 \times L))) \quad (4)$$

That is, when the F-number $F_P$ is calculated using the equation (4), the result is:

$$F_P = 1/(2 \times \sin(\tan^{-1}((20.2 + 10.51)/2 \times 47.5)))$$

$$F_P = 1/(2 \times \sin(\tan^{-1}(30.71/95))) \approx 1.63$$

It is understood that the F-number $F_P$ in this case is approximately 1.63, which is a very small value.

Generally, if the F-number $F_P$ of the projection optical system 3 is small, the brightness increases, but the designing of the illumination optical system 1 becomes difficult. Further, the diameter and the number of the lenses increase, and therefore the cost often increases. In contrast, if the F-number $F_P$ of the projection optical system 3 is large, the designing of the illumination optical system 1 becomes easier, but it becomes difficult to efficiently take in the light flux having passed through the incident side opening 10 in the case where the shifting amount of the projection optical system 3 is 0% (FIG. 7) since the effective diameter $E_P$ of the incident surface 3d of the projection optical system 3 becomes smaller.

Here, on condition that the F-number $F_I$ of the illumination optical system 1 is 2.4, and the distance L from the DMD element 2 to the incident side opening 10 of the projection optical system 3 is 47.5 mm as described above, the change in brightness is examined while the F-number $F_P$ of the projection optical system 3 is varied. The result is shown in TABLE 1. The experimental results No. 1 through No. 7 are obtained by varying the F-number $F_P$ of the projection optical system 3 in seven ways among 1.63, 1.77, 1.89, 2.04, 2.22, 2.4 and 2.6. The brightness is evaluated as a relative value with respect to the brightness (defined to be 100%) when the F-number $F_P$ of the projection optical system 3 is 1.63 (referred to as a standard value).

projection optical system 3 can not be incident on the incident surface 3d of the projection optical system 3, and therefore a loss of the amount of light occurs. The loss of the amount of light in this part "A" corresponds to the decreasing amount of the brightness (5%) from the standard value in the experimental result No. 4 shown in TABLE 1.

From TABLE 1, in the experimental results No. 1 through No. 5, i.e., in the case where the $F_P < F_I$, the decrease in the brightness for the shifting amount of 50% is not observed, and the decrease in the brightness for the shifting amount of 0% is slight. Therefore, by setting the F-number $F_P$ of the projection optical system 3 so as to satisfy $F_P < F_I$, it becomes possible to accomplish the lens shift function, to enhance the light use efficiency, and to display the image with excellent contrast.

In this regard, the brightness can be enhanced, as the F-number $F_P$ of the projection optical system 3 becomes

TABLE 1

ILLUMINATION OPTICAL SYSTEM $F_I$ = 2.4
DISTANCE FROM DMD ELEMENT TO INCIDENT SIDE
OPENING OF PROJECTION OPTICAL SYSTEM L = 47.5 mm

| | | No. | | | | | | |
|---|---|---|---|---|---|---|---|---|
| | | 1 | 2 | 3 | 4 | 5 | 6 | 7 |
| EFFECTIVE DIAMETER OF INCIDENT SURFACE OF PROJECTION OPTICAL SYSTEM $E_P$(mm) | | 30.71 | 28 | 26 | 24 | 22 | 20.2 | 18.6 |
| $F_P$ | | 1.63 | 1.77 | 1.89 | 2.04 | 2.22 | 2.4 | 2.6 |
| BRIGHTNESS | SHIFTING AMOUNT 50% | 100% | 100% | 100% | 100% | 100% | 98% | 93% |
| | SHIFTING AMOUNT 0% | 100% | 99% | 97% | 95% | 88% | 83% | 80% |

As shown in TABLE 1, as the F-number $F_P$ of the projection optical system 3 becomes larger, i.e., as the effective diameter $E_P$ of the incident surface 3d of the projection optical system 3 becomes smaller, the brightness for the shifting amount of 0% gradually decreases. In other words, as the F-number $F_P$ increases as 1.77, 1.89, 2.04, 2.22, 2.4 and 2.6, the brightness for the shifting amount of 0% decreases as 99%, 97%, 95%, 88%, 83% and 80% with respect to the standard value (the brightness when the F-number $F_P$ is 1.63 is defined to be 100%). Although the brightness for the shifting amount of 50% is 100% when the F-number $F_P$ is 1.77, 1.89, 2.04 and 2.22, the brightness for the shifting amount of 50% decreases to 98% when the F-number $F_P$ is 2.4, and further decreases to 93% when the F-number $F_P$ is 2.6.

Figure 8:
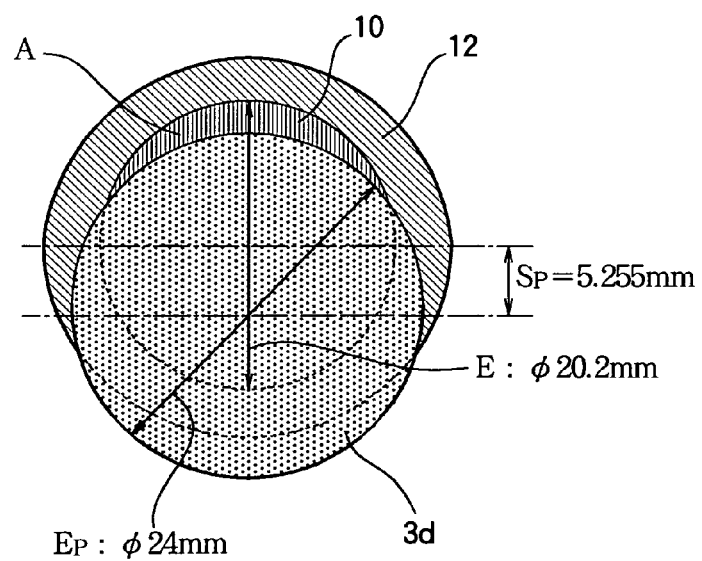
FIG. 8 is a view for illustrating a loss of light amount when the lens shift is performed in Embodiment 1 of the present invention.

The decrease in the brightness shown in TABLE 1 is caused because, as the effective diameter $E_P$ of the incident surface of the projection optical system 3 becomes smaller, a part of the light having passed through the incident side opening 10 cannot be taken in. FIG. 8 is a schematic view showing the light flux when the shifting amount is 0% in the experimental result No. 4 (F-number $F_P$ is 2.04). In FIG. 8, the light flux from the illumination optical system 1 is reflected by the to-be-illuminated surface 2b of the DMD element 2, and reaches the incident side opening 10 of the projection optical system 3 having the diameter E (20.2 mm). In this regard, the incident surface 3d of the projection optical system 3 has the center (projection optical axis 3a) at a position shifted downward from the center of the incident side opening 10 by 5.255 mm, and the effective diameter $E_P$ is 24 mm. In this state, the part of the light (a crescent-shaped part indicated by mark "A" in FIG. 8) having reached the incident side opening 10 of the smaller. However, the manufacturing cost can be reduced, as the F-number $F_P$ becomes larger. Therefore, the specific value of the F-number $F_P$ is determined based on the specific configuration and specification of the projection optical system 3 in view of a balance between the brightness and the manufacturing cost. Further, in addition to the brightness, optical properties such as MTF, distortion aberration or magnification chromatic aberration are taken into consideration.

Further, in the case where the center of the incident side opening 10 of the projection optical system 3 is disposed above the center of the DMD element 2 in the vertical direction by 5.255 mm, the brightness for the shifting amount in the vertical direction of 50% is the maximum. In this regard, the brightness varies in accordance with the position of the incident side opening 10 of the projection optical system 3 and emitting position of the light flux from the to-be-illuminated surface 2b of the DMD element 2. The position of the incident side opening 10 of the projection optical system 3, and the emitting position of the light flux from the to-be-illuminated surface 2b of the DMD element 2 can be determined based on the specification of the projection-type display apparatus.

As described above, according to Embodiment 1, the F-number $F_P$ of the projection optical system 3 is smaller than the F-number $F_I$ of the illumination optical system 1, and the incident side opening 10 of the projection-type optical system 3 is fixed (i.e., not moved by the movement of the projection optical system 3), and therefore it becomes possible to accomplish the lens shift function, to enhance the light use efficiency, and to display the image with excellent contrast.

In particular, it is not necessary to decenter the condenser lens of the illumination optical system in accordance with the movement of the projection optical system 3, and therefore it becomes possible to accomplish the lens shift function without increasing the size and cost of the projection-type image display apparatus. Furthermore, it is not necessary to use the telecentric optical system using a prism, and therefore it becomes possible to provide an inexpensive projection-type display apparatus. Additionally, by providing the aperture member 12 between the DMD element 2 and the projection optical system 3, it becomes possible to prevent the unnecessary light from reaching the screen, and to enhance the contrast.

Further, in Embodiment 1, the aperture member 12 defining the incident side opening 10 is provided in the vicinity of the incident surface of the projection optical system 3, and the effective diameter $E_P$ of the projection optical system 3 is larger than the incident side opening 10. Therefore, the light from the DMD element 2 can be efficiently taken in the projection optical system 3 even when the projection optical system 3 is shifted.

Furthermore, in Embodiment 1, the light ray proceeding through the center of the light flux from the second mirror 9 to the DMD element 2 is inclined with respect to the normal line 2a of the image forming area of the DMD element 2, and the light ray proceeding through the center of the light flux from the DMD element 2 to the projection optical system 3 is inclined with respect to the normal line 2a of the image forming area of the DMD element 2. Therefore, the second mirror 9, the DMD element 2 and the projection optical system 3 can be disposed in a compact manner without interfering with each other.

Further, in Embodiment 1, the second mirror 9 of the illumination optical system 1 is disposed on the reflection-type light valve 2 side with respect to the projection optical system 3 in the direction of the projection optical axis 3a, and therefore it becomes possible to prevent the interference between the projection optical system 3 and the illumination optical system 1 when the lens shift is performed. Therefore, it is not necessary to move the second mirror 9 in accordance with the movement of the projection optical system 3, with the result that the projection-type display apparatus can be configured to be inexpensive and compact.

Furthermore, in Embodiment 1, the light ray proceeding through the center of the light flux from the light intensity uniformizing element 6 to the first mirror 8 and the light ray proceeding through the center of the light flux from the reflection-type light valve 2 to the incident side opening 10 of the projection optical system 3 are approximately perpendicular to each other. Therefore, the layout becomes easy, and it becomes possible to prevent the failure of the light source lamp 4, with the result that an excellent image can be obtained.

Additionally, in Embodiment 1, the reflection-type light valve 2 is composed of the movable micro-mirrors that can change the angles of the reflection surfaces of the respective pixels, and therefore the distribution of the light intensity in the cross section of the illumination light flux can be uniform, and the uneven illumination can be prevented.

Further, in Embodiment 1, if the light intensity uniformizing element 6 is composed of the tubular member having inner surfaces reflecting the light, the heating of the element itself (due to the illumination light flux) hardly occurs. Therefore, the structure for cooling and retaining the light intensity uniformizing element 6 can be simple.

Furthermore, in Embodiment 1, if the light intensity uniformizing element 6 is composed of the transparent member in the shape of a rectangular column, the designing of the light intensity uniformizing element 6 can be easy.

Additionally, in Embodiment 1, if the light intensity uniformizing element 6 is composed of the lens array including a plurality of lens elements arranged in a plane, the distribution of the intensity of the illumination light flux in the cross section thereof can be uniform. Therefore, uneven illumination can be prevented.

Embodiment 2

Figure 9:
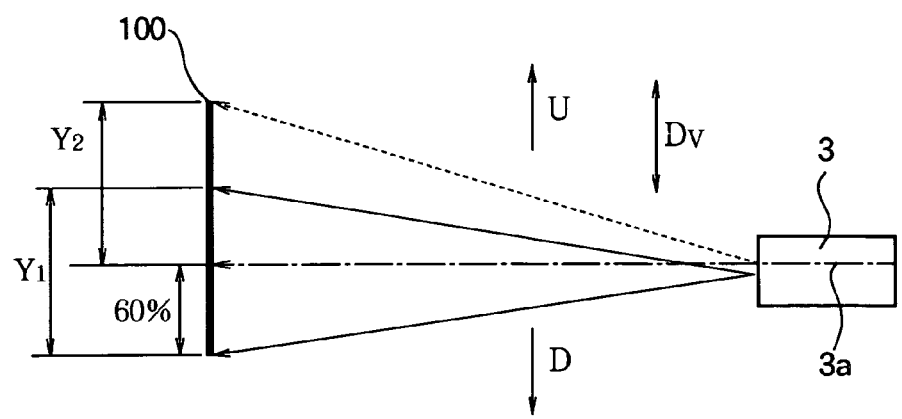
FIGS. 9(A) and 9(B) are views schematically showing a lens shift function in Embodiment 2 of the present invention.
Figure 9:
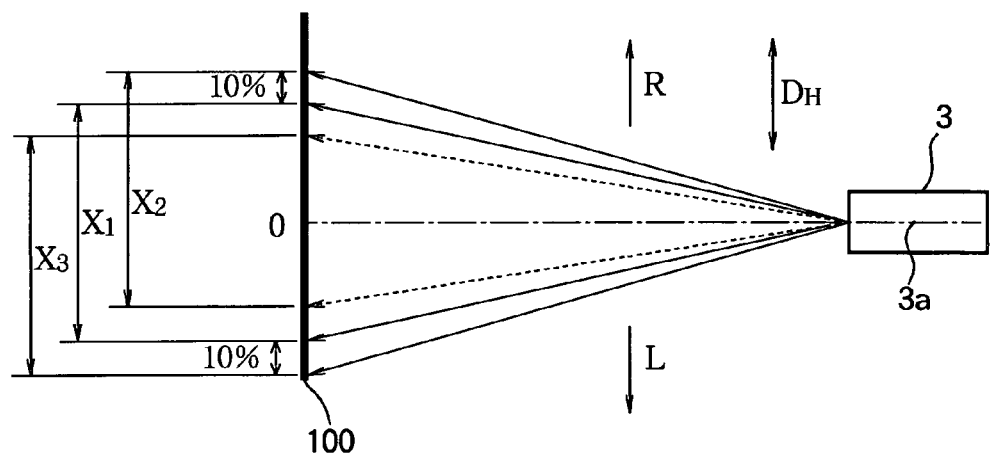

FIGS. 9(A) and 9(B) are views for illustrating the lens shift function of a projection-type display apparatus according to Embodiment 2 of the present invention. The projection-type display image apparatus according to Embodiment 2 of the present invention has the same basic configuration as the projection-type display apparatus according to Embodiment 1 having been described with reference to FIGS. 1 through 3. Hereinafter, the description will be made to the points in which the projection-type display apparatus according to Embodiment 2 differs from the projection-type display apparatus according to Embodiment 1.

FIG. 9(A) is a side view showing a projection optical system 3 and a screen 100 of the projection-type display apparatus according to Embodiment 2 as seen from the side. FIG. 9(B) is a plan view showing the projection optical system 3 and the screen 100 of the projection-type display apparatus according to Embodiment 2 as seen from above. When the projection optical system 3 moves in the vertical direction, the projection area on the screen 100 moves upward (arrow U) or downward (arrow D) as shown in FIG. 9(A). Further, when the projection optical system 3 moves in the horizontal direction, the projection area on the screen 100 moves to the left (arrow L) and to the right (arrow R) as shown in FIG. 9(B).

As in Embodiment 1, in FIG. 9A, when the projection optical system 3 is at a first position (lower position) in the vertical direction, the image is projected on an area indicated by mark $Y_1$ on the screen 100. In this state, the vertical position of the projection optical axis 3a of the projection optical system 3 is aligned with the center position of the projection area $Y_1$ in the vertical direction. In this state, the shifting amount of the projection optical system 3 is defined to be 0%.

In contrast, when the projection optical system 3 is at a second position (upper position) in the vertical direction, the image is projected on an area indicated by mark $Y_2$ on the screen 100. The vertical position of the projection optical axis 3a of the projection optical system 3 is aligned with the lower end of the projection area $Y_2$. The projection area $Y_2$ is shifted upward with respect to the projection area $Y_1$ by 60% (50% in Embodiment 1) of the projection width (in the direction of short axis). Therefore, in this state, the shifting amount of the projection optical system 3 is defined to be 60%. In a state where the shifting amount of the projection optical system 3 is 60%, the image is projected upward on the screen 100 from the projection optical system 3. The shifting amount (moving amount) of the projection optical system 3 itself is small compared with the moving amount of the projection area, and therefore omitted in FIG. 9(A).

As in Embodiment 1, in FIG. 9(B), when the projection optical system 3 is at a first position (center position) in the horizontal direction, the image is projected on an area indicated by mark $X_1$ on the screen 100. In this state, the horizontal position of the projection optical axis 3a of the projection optical system 3 is aligned with the center position of the projection area $X_1$ in the horizontal direction. In this state, the shifting amount of the projection optical system 3 is defined to be 0%.

Further, when the projection optical system 3 is at a second position (right end position) in the horizontal direction, the image is projected on an area indicated by mark $X_2$ on the screen 100. The projection area $X_2$ is shifted to the right with respect to the projection area $X_1$ by 10% of the projection width (in the direction of longer axis). Therefore, in this state, the shifting amount of the projection optical system 3 is defined to be 10%. Similarly, when the projection optical system 3 is at a third position (left end position) in the horizontal direction, the image is projected on an area indicated by mark $X_3$ on the screen 100. The projection area $X_3$ is shifted to the left with respect to the projection area $X_1$ by 10% of the projection width. Therefore, in this state, the shifting amount of the projection optical system 3 is defined to be −10%.

The shifting amounts of the projection optical system 3 in the vertical and horizontal directions depend on the configuration of the projection optical system 3, and are not limited to the ranges shown in FIGS. 9(A) and 9(B).

In order to accomplish the lens shift function shown in FIGS. 9(A) and 9(B), it is necessary to design the image circle 11 of the projection optical system 3 to have a size corresponding to the shifting amount. Here, the rectangular DMD element 2 has a dimension $H_d$ of 14.01 mm in the horizontal direction (the direction of longer axis, i.e., the direction of longer sides), and a dimension $V_d$ of 10.51 mm in the vertical direction (the direction of shorter axis, i.e., the direction of shorter sides). The shifting amount in the vertical direction is 60%, and the shifting amount in the horizontal direction is ±10%. The size of the image circle 11 on this condition is shown in FIGS. 10(A) through 10(C).

Figure 10A:
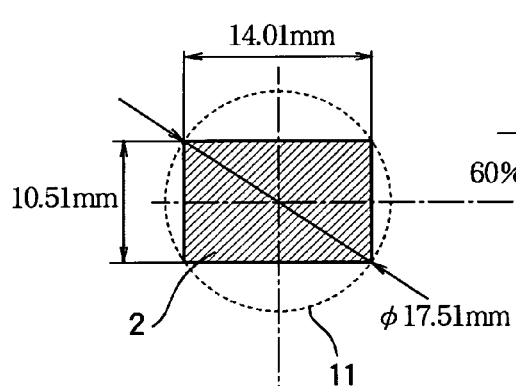
FIGS. 10(A) through 10(C) are views schematically showing an image circle of a projection optical system of Embodiment 2 of the present invention.

FIG. 10(A) shows the image circle 11 when both of the shifting amounts of the projection optical system 3 in the horizontal and vertical directions are 0%. In this case, the image circle 11 of the projection optical system 3 is a circle having a diameter of 17.51 mm.

Figure 10B:
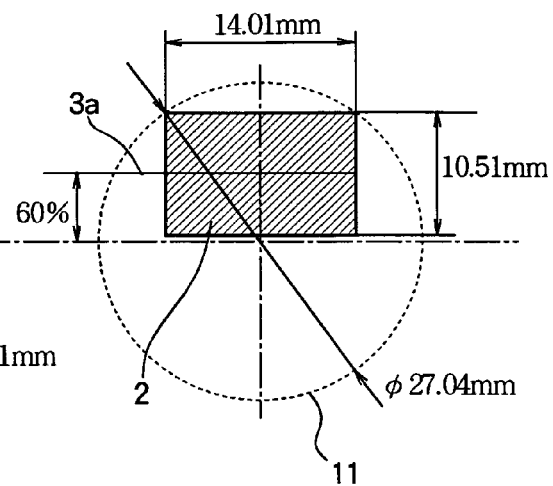

FIG. 10(B) shows the image circle 11 when the shifting amount of the projection optical system 3 in the vertical direction is 60% and the shifting amount in the horizontal direction is 0%. In this case, the center of the image circle 11 is at a position shifted from the center of the DMD element 2 in the vertical direction by the shifting amount (60%), and therefore the image circle 11 is a circle having a diameter of 27.04 mm.

Figure 10C:
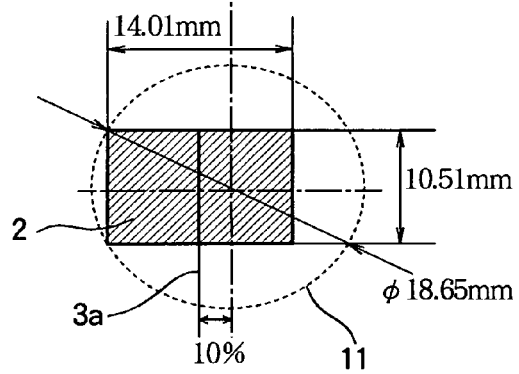

FIG. 10(C) shows the image circle 11 when the shifting amount of the projection optical system 3 in the vertical direction is 0% and the shifting amount in the horizontal direction is 10%. In this case, the center of the image circle 11 is at a position shifted from the center of the DMD element 2 in the horizontal direction by the shifting amount (10%), and therefore the image circle 11 is a circle having a diameter of 18.65 mm. FIG. 10(C) shows an example in which the projection optical system 3 is shifted to one side in the horizontal direction (left side). However, even when the projection optical system 3 is shifted to the other side in the horizontal direction (right side), the DMD element 2 is included in the image circle 11 having a diameter of 18.65 mm as shown in FIG. 10(C).

FIGS. 10(B) and 10(C) shows examples in which the projection optical system 3 is shifted only in the vertical direction and only in the horizontal direction. However, by appropriately determining the image circle 11, it becomes possible to display the image while shifting the projection optical system in both of the vertical and horizontal directions. Here, the diameter of the image circle 11 is set to 27.04 mm as shown in FIG. 10(B).

Figure 11:
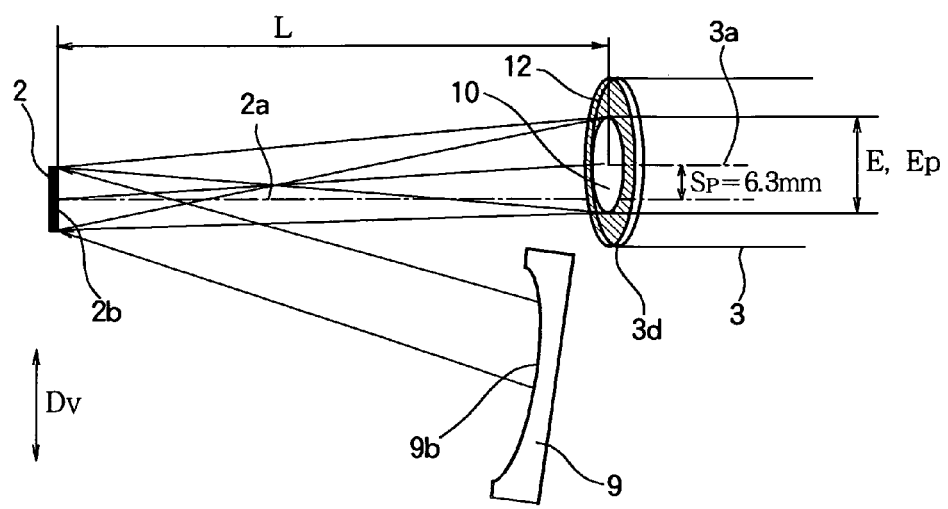
FIG. 11 is a view schematically showing an arrangement of the projection optical system shifted in the vertical direction in Embodiment 2 of the present invention.

The configuration of the illumination optical system 1 and the projection optical system 3 in Embodiment 2 will be described. As described above, the diameter of the image circle 11 of the projection optical system 3 is set to 27.04 mm. Therefore, if the shifting direction is only the vertical direction, the projection optical system 3 is able shift up to the shifting amount of 60% (FIG. 10(B)). FIG. 11 shows the light path when the shifting amount of the projection optical system 3 in the vertical direction is 60%.

As shown in FIG. 11, an aperture member (an opening defining member) 12 defining an incident side opening 10 of the projection optical system 3 is disposed on slightly DMD element 2 side with respect to the incident surface 3d of the projection optical system 3. The incident side opening 10 of the aperture member 12 has a circular shape having the diameter E, and the surrounding portion around the incident side opening 10 is coated with black coating or the like for shielding against the unnecessary light. The shifting amount of the projection optical system 3 in the vertical direction is 60%, and therefore the projection optical axis 3a of the projection optical system 3 is at a position shifted from the normal line 2a passing through the center of the to-be-illuminated surface 2b of the DMD element 2 in the vertical direction, i.e., the direction of shorter axis of the DMD element 2, by 60% (i.e., 6.3 mm). The center of the incident side opening 10 defined by the aperture member 12 is on a position shifted from the normal line 2a of the DMD element 2 in the vertical direction by 60% (i.e., 6.3 mm).

The light flux from the illumination optical system 1 (the light flux reflected by the second reflection mirror 9 of the illumination optical system 1) is reflected by the to-be-illuminated surface 2b of the DMD element 2, proceeds through the incident side opening 10 of the projection optical system 3, and is incident on the projection optical system 3. The distance from the to-be-illuminated surface 2b of the DMD element 2 to the incident side opening 10 of the projection optical system 3 is referred to as L. The diameter of the incident side opening 10 is referred to as E. As the widening of the light flux of the illumination optical system 1 is designed in accordance with the diameter E of the incident side opening 10, an F-number $F_I$ of the illumination optical system 1 is calculated by the following equation (1):

$$F_I = 1/(2 \times \mathrm{Sin}(\mathrm{Tan}^{-1}(E/2 \times L))) \qquad (1)$$

The brightness of the illumination optical system 1 is determined by the F-number $F_I$ of the illumination optical system 1.

In contrast, the projection optical system 3 is needed to have a size sufficient for taking in the light flux having passed through the incident side opening 10 of the projection optical system 3. The incident surface 3d of the projection optical system 3 and the incident side opening 10 are disposed close to each other. Therefore, if the projection optical axis 3a and the center of the incident side opening 10 of the projection optical system 3 are aligned with each other as shown in FIG. 11, it is only necessary that the effective diameter $E_P$ of the incident surface 3d of the projection optical system 3 is approximately the same as or slightly larger than the diameter E of the incident side opening 10. This means that the F-number $F_P$ of the projection optical system 3 can be approximately the same as or slightly smaller than the F-number $F_I$ of the projection optical system 3, i.e., the bright illumination optical system 1 can be configured.

Figure 12:
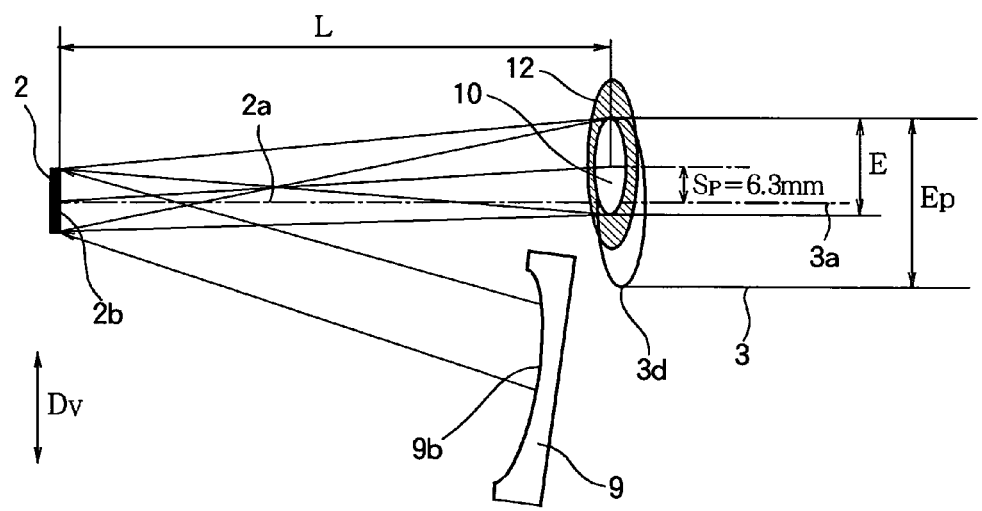
FIG. 12 is a view schematically showing an arrangement of the projection optical system shifted in the vertical direction in Embodiment 2 of the present invention.

FIG. 12 shows a state where the shifting amount of the projection optical system 3 in the vertical direction (direction $D_V$) is 0%. As shown in FIG. 12, even when the projection optical system 3 shifts (here, shifts downward), the components other than the projection optical system 3 (the illumination optical system 1, the DMD element 2 and the aperture member 12 defining the incident side opening 10) do not move. The light flux from the illumination optical system 1 is reflected by the to-be-illuminated surface 2b of the DMD element 2 and reaches the incident side opening 10 of the projection optical system 3 having the center at a position shifted from the normal line 2a passing through the center of the DMD element 2 by 6.3 mm (=10.51 mm×60%). In order to take in all the light flux having passed through the incident side opening 10, it is necessary to set the effective diameter $E_P$ of the incident surface 3d of the projection optical system 3 larger than the diameter E of the incident side opening 10 by an amount corresponding to double the shifting amount $S_P$ (double 6.3 mm in FIG. 12).

Here, the description will be made to the case where the F-number $F_I$ of the illumination system 1 is set to 2.4. When the F-number $F_I$ of the illumination system 1 is set to 2.4, and the distance L from the to-be-illuminated surface 2b of the DMD element 2 to the incident side opening 10 of the projection optical system 3 is set to 44.5 mm, the diameter E of the incident side opening 10 is calculated using the above described equation (1) as follows:

$$E = (2 \times 44.5) \times \mathrm{Tan}(\mathrm{Sin}^{-1}(1/(2 \times 2.4))) \approx 18.9$$

and the result is approximately 18.9 mm. When the F-number $F_I$ of the illumination optical system 1 is 2.4, and when the shifting amount of the projection optical system 3 is 60% as shown in FIG. 11, it is possible to effectively take in the light flux from the illumination optical system 1 in the case where the effective diameter $E_P$ of the incident surface 3d of the projection optical system 3 has the size approximately the same as 18.9 mm. In this state, since the incident side opening 10 and the incident surface 3d of the projection optical system 3 are disposed close to each other, the distance from the to-be-illuminated surface 2b of the DMD element 2 to the incident surface 3d is approximately the same as L. Therefore, it is possible to take in the light flux having passed through the incident side opening 10, by setting the F-number $F_P$ of the projection optical system 3 to 2.4 which is the same as the F-number $F_I$ of the irradiation optical system 1, or to a value (for example, 2.35) slightly smaller than 2.4.

Similarly, as shown in FIG. 12, if the shifting amount $S_P$ of the projection optical system 3 is 0%, the diameter E of the incident side opening 10 is 18.9 mm. The effective diameter $E_P$ of the incident surface 3d of the projection optical system 3 is larger by double 6.3 mm (i.e., 12.6 mm), and is 31.5 mm (18.9 mm+12.6 mm). The F-number $F_P$ of the projection optical system 3 can be calculated using the following equation having been described in Embodiment 1:

$$F_P = 1/(2 \times \mathrm{Sin}(\mathrm{Tan}^{-1}(E_P/2 \times L))) \quad (2)$$

Here, $E_P = E + 2 \times S_P$ (3)

Based on the equations (2) and (3), the F-number $F_P$ can be calculated according to the following equation (4):

$$F_P = 1/(2 \times \mathrm{Sin}(\mathrm{Tan}^{-1}((E+2 \times S_P)/2 \times L))) \quad (4)$$

That is, when the F-number $F_P$ is calculated using the equation (4), the result is:

$$F_P = 1/(2 \times \mathrm{Sin}(\mathrm{Tan}^{-1}((18.9+12.6)/2 \times 44.5)))$$

$$F_P = 1/(2 \times \mathrm{Sin}(\mathrm{Tan}^{-1}(31.5/89))) \approx 1.5$$

It is understood that the F-number $F_P$ in this case is approximately 1.5, which is a very small value.

Generally, if the F-number $F_P$ of the projection optical system 3 is small, the brightness increases, but the designing of the illumination optical system 1 becomes difficult. Further, the diameter and the number of the lenses increase, and therefore the cost often increases. In contrast, if the F-number $F_P$ of the projection optical system 3 is large, the designing of the illumination optical system 1 becomes easier, but it becomes difficult to efficiently take in the light flux having passed through the incident side opening 10 in the case where the shifting amount of the projection optical system 3 is 0% (FIG. 12) since the effective diameter $E_P$ of the incident surface 3d of the projection optical system 3 becomes smaller.

Here, on condition that the F-number $F_I$ of the illumination optical system 1 is 2.4, and the distance L from the DMD element 2 to the incident side opening 10 of the projection optical system 3 is 44.5 mm as described above, the change in brightness is examined while the F-number $F_P$ of the projection optical system 3 is varied. The result is shown in TABLE 2. The experimental results No. 1 through No. 7 are obtained by varying the F-number $F_P$ of the projection optical system 3 in seven ways among 1.5, 1.8, 1.9, 2.0, 2.2, 2.4 and 2.6. The brightness is evaluated as a relative value with respect to the brightness (defined to be 100%) when the F-number $F_P$ of the projection optical system 3 is 1.5 (referred to as a standard value).

TABLE 2

ILLUMINATION OPTICAL SYSTEM $F_I$ = 2.4
DISTANCE FROM DMD ELEMENT TO INCIDENT SIDE
OPENING OF PROJECTION OPTICAL SYSTEM L = 44.5 mm

| | | No. | | | | | | |
|---|---|---|---|---|---|---|---|---|
| | | 1 | 2 | 3 | 4 | 5 | 6 | 7 |
| EFFECTIVE DIAMETER OF INCIDENT SURFACE OF PROJECTION OPTICAL SYSTEM $E_P$(mm) | | 32 | 26 | 24 | 23 | 21 | 19 | 17 |
| $F_P$ | | 1.5 | 1.8 | 1.9 | 2.0 | 2.2 | 2.4 | 2.6 |
| BRIGHTNESS | SHIFTING AMOUNT 60% | 100% | 100% | 100% | 100% | 100% | 98% | 93% |
| | SHIFTING AMOUNT 0% | 100% | 99% | 97% | 95% | 88% | 85% | 80% |

As shown in TABLE 2, as the F-number $F_P$ of the projection optical system 3 becomes larger, i.e., as the effective diameter $E_P$ of the incident surface 3d of the projection optical system 3 becomes smaller, the brightness for the shifting amount of 0% gradually decreases. In other words, as the F-number $F_P$ increases as 1.8, 1.8, 2.0, 2.2, 2.4 and 2.6, the brightness for the shifting amount of 0% decreases as 99%, 97%, 95%, 88%, 83% and 80% with respect to the standard value (the brightness when the F-number $F_P$ is 1.5 is defined to be 100%). Although the brightness for the shifting amount of 60% is 100% when the F-number $F_P$ is 1.8, 1.9, 2.0 and 2.2, the brightness for the shifting amount of 60% decreases to 98% when the F-number $F_P$ is 2.4, and further decreases to 93% when the F-number $F_P$ is 2.6.

Figure 13:
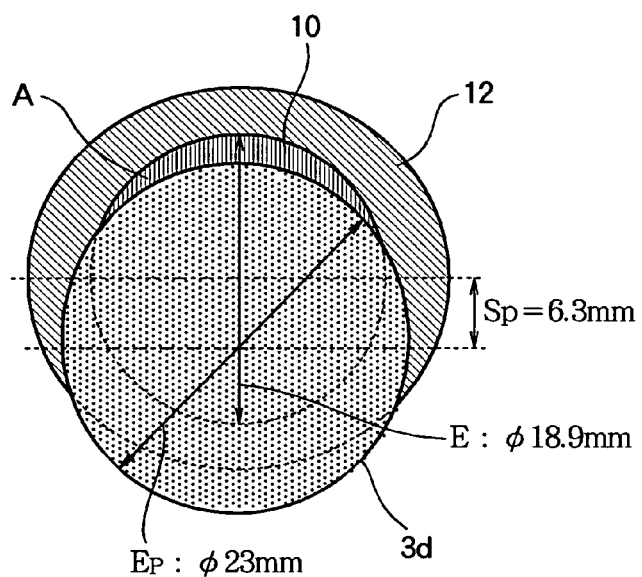
FIG. 13 is a view for illustrating a loss of light amount when the lens shift is performed in Embodiment 2 of the present invention.

The decrease in the brightness shown in TABLE 2 is caused because, as the effective diameter $E_P$ of the incident surface of the projection optical system 3 becomes smaller, a part of the light having passed through the incident side opening 10 cannot be taken in. FIG. 13 is a schematic view showing the light flux when the shifting amount is 0% in the experimental result No. 4 (F-number $F_P$ is 2.0). In FIG. 13, the light flux from the illumination optical system 1 is reflected by the to-be-illuminated surface 2b of the DMD element 2, and reaches the incident side opening 10 of the projection optical system 3 having the diameter E (18.9 mm). In this regard, the incident surface 3d of the projection optical system 3 has the center (projection optical axis 3a) at a position shifted downward from the center of the incident side opening 10 by 6.3 mm, and the effective diameter $E_P$ is 23 mm. In this state, the part of the light (a crescent-shaped part indicated by mark "A" in FIG. 13) reaching the incident side opening 10 of the projection optical system 3 can not be incident on the incident surface 3d of the projection optical system 3, and therefore a loss of the amount of light occurs. The loss of the amount of light of this part "A" corresponds to the decreasing amount of the brightness (5%) from the standard value in the experimental result No. 4 shown in TABLE 2.

From TABLE 2, in the experimental results No. 1 through No. 5, i.e., in the case where the $F_I > F_P$, the decrease in the brightness for the shifting amount of 60% is not observed, and the decrease in the brightness for the shifting amount of 0% is slight. Therefore, by setting the F-number $F_P$ of the projection optical system 3 so as to satisfy $F_I > F_P$, it becomes possible to accomplish the lens shift function, to enhance the light use efficiency, and to display the image with excellent contrast.

In this regard, in the experimental result No. 1, there is no loss of brightness even when the shifting amount is 0%, and it is understood that all of the light flux from the illumination optical system 1 can be taken in. In this case, the F-number $F_P$ is 1.5, which is a very small value. Therefore, the designing of the projection optical system 3 becomes very difficult, the diameter of the lens becomes large, and the number of the lens increases, with the result that the manufacturing cost increases.

The brightness can be enhanced, as the F-number $F_P$ of the projection optical system 3 becomes smaller. However, the manufacturing cost can be reduced, as the F-number $F_P$ becomes larger. Therefore, the specific value of the F-number $F_P$ is determined based on the specific configuration and specification of the projection optical system 3 in view of a balance between the brightness and the manufacturing cost. Further, in addition to the brightness, optical properties such as MTF, distortion aberration or magnification chromatic aberration are taken into consideration.

Further, in the case where the center of the incident side opening 10 of the projection optical system 3 is disposed above the center of the DMD element 2 in the vertical direction by 6.3 mm, the brightness for the shifting amount in the vertical direction of 60% is the maximum. In this regard, the brightness varies in accordance with the position of the incident side opening 10 of the projection optical system 3 and emitting position of the light flux from the to-be-illuminated surface 2b of the DMD element 2. The position of the incident side opening 10 of the projection optical system 3, and the emitting position of the light flux from the to-be-illuminated surface 2b of the DMD element 2 can be determined based on the specification of the projection-type display apparatus.

With regard to the shifting amount $S_P$ of the projection optical system 3 in the vertical direction, if the shifting amount is small, the second mirror 9 of the illumination optical system 1 interferes with the light flux from the DMD element 2 as shown in FIG. 3, and causes a loss of the amount of light. In contrast, if the shifting amount is large, the image circle 11 of the projection-type optical system 3 shown in FIGS. 10(A) through 10(C) becomes large, and the designing of the projection optical system 3 becomes difficult.

That is, in order to eliminate the interference between the second mirror 9 and the light flux from the DMD element 2, it is preferable that the shifting amount $S_P$ of the projection optical system 3 in the vertical direction is larger than 0.4 times the dimension $V_d$ of the DMD element 2 in the vertical direction. Further, in order to prevent the increase in the image circle of the projection optical system 3, it is preferable that the shifting amount $S_P$ of the projection optical system 3 in the vertical direction is smaller than 0.7 times the dimension $V_d$ of the DMD element 2 in the vertical direction. This condition is can be expressed as the following formula (5):

$$0.7 \times V_d > S_P > 0.4 \times V_d \quad (5)$$

As described above, according to Embodiment 2, the F-number of the projection optical system 3 is set to satisfy the above described equations (1) and (2), and the incident side opening 10 of the projection-type optical system 3 is fixed (i.e., not moved by the movement of the projection optical system 3), and therefore it becomes possible to accomplish the lens shift function, to enhance the light use efficiency, and to display the image with excellent contrast.

In particular, it is not necessary to decenter the condenser lens of the illumination optical system in accordance with the movement of the projection optical system 3, and therefore it becomes possible to accomplish the lens shift function without increasing the size and cost of the projection-type image display apparatus. Furthermore, it is not necessary to use the telecentric optical system having a prism, and therefore it becomes possible to provide an inexpensive projection-type display apparatus. Additionally, by providing the aperture member 12 between the DMD element 2 and the projection optical system 3, it becomes possible to prevent the unnecessary light from reaching the screen, and to enhance the contrast.

Further, in Embodiment 2, the aperture member 12 defining the incident side opening 10 is provided in the vicinity of the incident surface of the projection optical system 3, and the effective diameter $E_P$ of the projection optical system 3 is larger than the incident side opening 10. Therefore, the light from the DMD element 2 can be efficiently taken in the projection optical system 3 even when the projection optical system 3 is shifted.

Furthermore, in Embodiment 2, the shifting amount of the projection optical system 3 satisfy the above described formula (5), and therefore it becomes possible to enhance the light use efficiency and to display the image with excellent contrast.

Furthermore, in Embodiment 2, the light ray proceeding through the center of the light flux from the second mirror 9 to the DMD element 2 is inclined with respect to the normal line 2a of the image forming area of the DMD element 2, and the light ray proceeding through the center of the light flux from the DMD element 2 to the projection optical system 3 is incline with respect to the normal line 2a of the image forming area of the DMD element 2. Therefore, the second mirror 9, the DMD element 2 and the projection optical system 3 can be disposed in a compact manner without interfering with each other.

Further, in Embodiment 2, the second mirror 9 of the illumination optical system 1 is disposed on the reflection-type light valve 2 side with respect to the projection optical system 3 in the direction of the projection optical axis 3a, and therefore it becomes possible to prevent the interference between the projection optical system 3 and the illumination optical system 1 when the lens shift is performed. Therefore, it is not necessary to move the second mirror 9 in accordance with the movement of the projection optical system 3, with the result that the projection-type display apparatus can be configured to be inexpensive and compact.

Furthermore, in Embodiment 2, the light ray proceeding through the center of the light flux from the light intensity uniformizing element 6 to the first mirror 8 and the light ray proceeding through the center of the light flux from the reflection-type light valve 2 to the incident side opening 10 of the projection optical system 3 are approximately perpendicular to each other. Therefore, the layout becomes easy, and it becomes possible to prevent the failure of the light source lamp 4, with the result that an excellent image can be obtained.

Additionally, in Embodiment 2, the reflection-type light valve 2 is composed of the movable micro-mirrors that can change the angles of the reflection surfaces of the respective pixels, and therefore the distribution of the light intensity in the cross section of the illumination light flux can be uniform, and the uneven illumination can be prevented.

Further, in Embodiment 2, if the light intensity uniformizing element 6 is composed of the tubular member having inner surfaces that reflect the light, the heating of the element (due to the illumination light flux) hardly occurs. Therefore, the structure for cooling and retaining the light intensity uniformizing element 6 can be simple.

Furthermore, in Embodiment 2, if the light intensity uniformizing element 6 is composed of the transparent member in the shape of a rectangular column, the designing of the light intensity uniformizing element 6 can be easy.

Additionally, in Embodiment 2, if the light intensity uniformizing element 6 is composed of a lens array including a plurality of lens elements arranged in a plane, the distribution of the intensity of the illumination light flux in the cross section thereof can be uniform. Therefore, uneven illumination can be prevented.

Embodiment 3

On the designing of the projection optical system 3, as the F-number $F_P$ of the projection optical system 3 becomes smaller, the designing becomes difficult and the manufacturing cost increases. In contrast, as the length L from the to-be-illuminated surface 2b of the DMD element 2 to the incident side opening 10 of the projection optical system 3 becomes longer, the designing of the projection optical system 3 similarly becomes difficult and the manufacturing cost increases. However, as shown in FIGS. 1 and 3, the second mirror 9 is disposed below and adjacent to the projection optical system 3, and it is necessary to dispose the second mirror 9 at a position on the DMD element 2 side with respect to the lens barrel 3c of the projection optical system 3 (in the direction of the projection optical axis 3a) in order to prevent the projection optical system 3 from interfering with the second mirror 9 when the projection optical system 3 moves for the lens shift. Considering this layout, it is preferable that the distance L is as long as possible.

Figure 14:
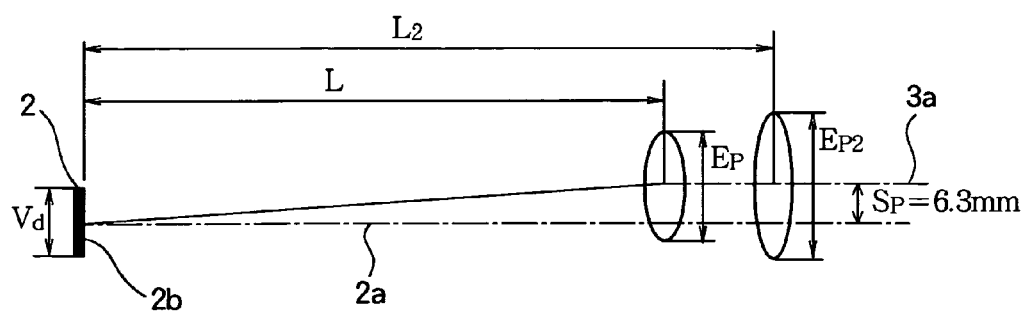
FIG. 14 is a view for illustrating the distance from the DMD element to the incident surface of the projection optical system and the performance of the projection-type display apparatus according to Embodiment 3 of the present invention.

FIG. 14 is a view for illustrating the distance from the DMD element to the incident surface of the projection optical system and the performance of the projection-type display apparatus according to Embodiment 3 of the present invention. As shown in FIG. 14, if the length L from the to-be-illuminated surface 2b of the DMD element 2 to the incident side opening 10 of the projection optical system 3 increases to the length $L_2$, the effective diameter $E_{P2}$ of the incident surface of the projection optical system 3 becomes larger than the effective diameter $E_P$, for the same shifting amount $S_P$ (6.3 mm in FIG. 14) and the same F-number $F_P$. As the distance L increases, the ratio $E_P/V_d$ of the effective diameter $E_P$ of the incident surface of the projection optical system 3 to the dimension $V_d$ of the DMD element 2 in the vertical dimension also increases. Therefore, on condition that the F-number $F_I$ of the illumination optical system 1 is 2.4, and the F-number $F_P$ of the projection optical system 3 is 2.0, the change in the performance is examined while varying the length L from the to-be-illustrated surface 2b of the DMD element 2 to the incident side opening 10 of the projection optical system 3. The brightness is evaluated as a relative value with respect to the brightness (defined to be 100%) when the F-number $F_P$ of the projection optical system 3 is 1.5 (referred to as a standard value).

TABLE 3

ILLUMINATION OPTICAL SYSTEM $F_I$ = 2.4
PROJECTION OPTICAL SYSTEM $F_P$ = 2.0
DIMENSION OF DMD ELEMENT IN VERTICAL
DIRECTION $V_d$ = 10.51 mm

| | | No. | | | | |
|---|---|---|---|---|---|---|
| | | 1 | 2 | 3 | 4 | 5 |
| DISTANCE FROM DMD ELEMENT TO INCIDENT SURFACE OF PROJECTION OPTICAL SYSTEM L (mm) | | 45.5 | 44.5 | 43.5 | 42.5 | 41.5 |
| EFFECTIVE DIAMETER OF INCIDENT SURFACE OF PROJECTION OPTICAL SYSTEM $E_P$(mm) | | 23.5 | 23.0 | 22.5 | 21.9 | 21.4 |
| $E_P/V_d$ | | 2.23 | 2.19 | 2.14 | 2.09 | 2.04 |
| BRIGHT-NESS | SHIFTING AMOUNT 60% | 100% | 100% | 98% | 97% | 96% |
| | SHIFTING AMOUNT 0% | 98% | 95% | 93% | 92% | 89% |

As shown in TABLE 3, in the case where the distance L from the to-be-illuminated surface 2b of the DMD element 2 to the incident side opening 10 of the projection optical system 3 is varied from 45.5 mm to 41.5 mm, the effective diameter $E_P$ of the incident surface of the projection optical system 3 is 23.5 mm when the distance L is 41.5 mm, and the effective diameter $E_P$ of the incident surface of the projection optical system 3 is 21.4 mm when the distance L is 45.5 mm. That is, as the distance L decreases, the effective diameter $E_P$ also increases. When the distance L is 45.5 mm, the brightness as the performance of the optical system is 100% in the case where the shifting amount is 60%, and the brightness as the performance of the optical system is 98% in the case where the shifting amount is 0%, which is an excellent result. Further, when the distance L is 44.5 mm, the brightness as the performance of the optical system is 100% in the case where the shifting amount is 60%, and the brightness as the performance of the optical system is 95% in the case where the shifting amount is 0%. However, as the distance L decreases, the amount of the loss of brightness increases.

From TABLE 3, in the experimental results No. 1 and No. 2, there is no loss of brightness when the shifting amount is 60%, and the amount of loss when the shifting amount is 0% is within 5%, with the result that an excellent performance can be obtained. In this state, the effective diameter $E_P$ of the incident surface of the projection optical system 3 and the dimension $V_d$ of the DMD element 2 in the vertical direction satisfy the following formula:

$$E_P/V_d > 2.15$$

Therefore, by determining the effective diameter $E_P$ of the incident surface of the projection optical system 3 and the dimension $V_d$ of the DMD element 2 in the vertical direction so as to satisfy this formula, it becomes possible to reduce the amount of the loss of brightness.

As described above, in Embodiment 3, the ratio of the effective diameter $E_P$ of the incident surface of the projection optical system 3 to the dimension of the DMD element 2 (determined by the distance L to the incident side opening 10 of the projection optical system 3) satisfies $E_P/V_d > 2.15$, and therefore it becomes possible to accomplish the lens shift function, to enhance the light use efficiency, and to display the image with excellent contrast.

Embodiment 4

Figure 15:
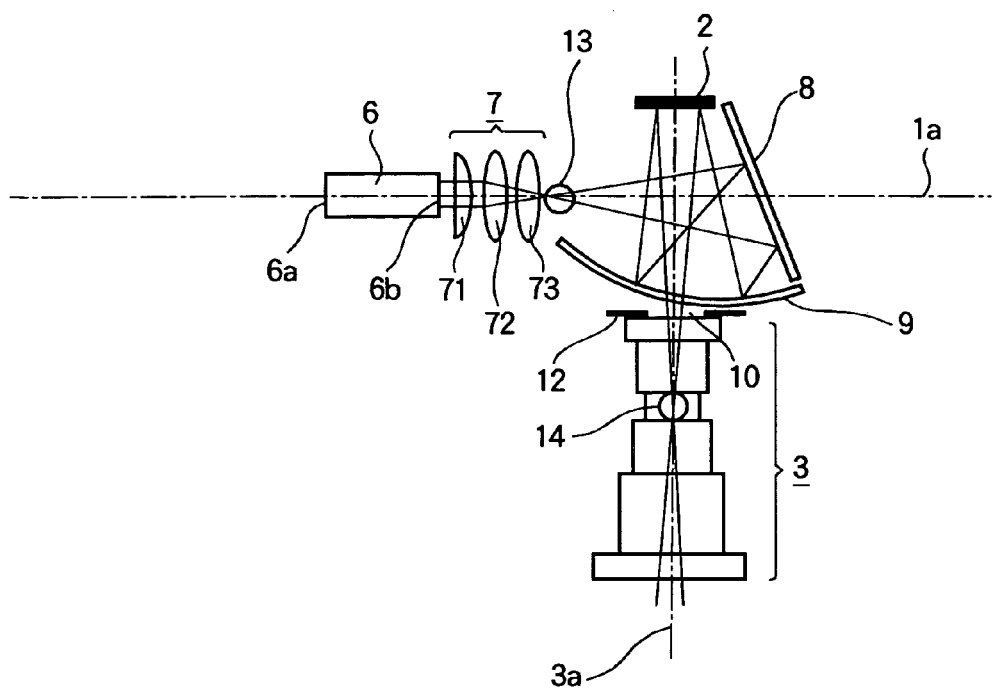
FIG. 15 is a view for illustrating a focusing point of an illumination optical system of the projection-type display apparatus according to Embodiment 4 of the present invention.

FIG. 15 is a view for illustrating a focusing point of an illumination optical system of a projection-type display apparatus according to Embodiment 4 of the present invention. As shown in FIG. 15, in the projection-type display apparatus according to Embodiment 4, an aperture 13 of the illumination optical system 1 is disposed on a position of the first mirror 8 side (the exit side) of the relay lens group 7. With regard to the aperture 13 of this illumination optical system 1, there are many cases where a member defining an opening is not provided. As shown in FIG. 15, the light flux emitted from the light intensity uniformizing element 6 is once focused at the aperture 13. With the configuration that the aperture 13 of the illumination optical system 1 and the entrance pupil position of the projection optical system 3 have an optically conjugate relationship, the light use efficiency can be enhanced.

Essentially, in the apparatus having the lens shift function that moves the projection optical system 3, it is preferable to dispose the entrance pupil position of the projection optical system 3 on the DMD element 2 side with respect to the projection optical system 3 (i.e., the incident side opening 10 of the projection optical system 3). However, if the entrance pupil position is provided outside the lenses of the projection optical system 3, the designing of the projection optical system 3 are largely constrained, so that the designing becomes difficult. For this reason, as shown in FIG. 15, the projection-type display apparatus according to Embodiment 4 is configured to dispose a focusing point 14 of the illumination optical system 1 (i.e., the entrance pupil position of the projection optical system 3) on the screen side with respect to the incident surface of the projection optical system 3, i.e., in the interior of the projection optical system 3.

As described above, in Embodiment 4, the focusing point 14 of the illumination optical system 1 is disposed on the screen side with respect to the incident surface of the projection optical system 3. Therefore, the limitations on the designing of the projection optical system 3 can be reduced, and the flexibility of the designing is enhanced.

In the above description, although the expressions "up" and "down" are used to indicate the directions on condition that the projection-type display apparatus is in practical use, the projection-type display apparatus can be installed in the attitude that differs from the above description.

Further, in the above description, the configuration in which the rotary color filter 5 is disposed between the light source lamp 4 and the light intensity uniformizing element 6 has been explained. However, it is also possible to dispose the rotary color filter 5 on other position where the illumination light flux is focused to a small size such as a position immediately behind the light intensity uniformizing element 6.

Furthermore, in the above description, the case in which the DMD element is used as the reflection-type light valve 2 has been explained. However, it is also possible to use other light valve such as reflection-type liquid crystal display device.

The invention claimed is:

1. A projection-type display apparatus;
an illumination optical system including a light source;
a reflection-type light valve having an image forming area on a to-be-illuminated surface illuminated by said illumination optical system, and
a projection optical system that projects an image formed on said image forming area of said reflection-type light valve, said projection optical system being shiftable in a direction approximately perpendicular to a projection optical axis,
wherein an F-number of said projection optical system is smaller than an F-number of said illumination optical system, and
wherein an opening defining member that defines an incident side opening of said projection optical system is provided between said projection optical system and said reflection-type light valve, said opening defining member not being moved by the shifting of said projection optical system.

2. The projection-type display apparatus according to claim 1, wherein an effective diameter of an incident surface of said projection optical system is larger than said incident side opening.

3. The projection-type display apparatus according to claim 1, wherein said opening defining member is disposed in the vicinity of an incident surface of said projection optical system.

4. The projection-type display apparatus according to claim 1, wherein said illumination optical system comprises:
a light intensity uniformizing element that uniformizes an intensity distribution of a light flux emitted by said light source, and
a relay optical system that introduces said light flux emitted by said light intensity uniformizing element to said reflection-type light valve,
wherein a light ray proceeding through a center of a light flux from said relay optical system to said reflection-type light valve is inclined with respect to a normal line of said image forming area of said reflection-type light valve.

5. The projection-type display apparatus according to claim 4, wherein a light ray proceeding through a center of a light flux from said image forming area of said reflection-type light valve to said projection optical system is inclined with respect to a normal line of said image forming area of said reflection-type light valve.

6. The projection-type display apparatus according to claim 5, wherein said relay optical system comprises:
 a relay lens group that transmits a light flux emitted by said light intensity uniformizing element;
 a first mirror that reflects said light flux emitted by said relay lens group, and
 a second mirror that reflects a reflected light flux from said first mirror to said reflection-type light valve,
 wherein said second mirror is disposed on said reflection-type light valve side with respect to said projection optical system in the direction of said projection optical axis.

7. The projection-type display apparatus according to claim 6, wherein a light ray proceeding through a center of a light flux from said light intensity uniformizing element to said first mirror and a light ray proceeding through a center of a light flux from said reflection-type light valve to said projection optical system are approximately perpendicular to each other, as seen in a direction parallel to a shifting direction of said projection optical system.

8. The projection-type display apparatus according to claim 1, wherein said reflection-type light valve includes a plurality of movable micro-mirrors capable of changing directions of reflection surfaces.

9. The projection-type display apparatus according to claim 1, wherein said light intensity uniformizing element is composed of a tubular member, and is configured to reflect a light flux at inner surfaces of said tubular member.

10. The projection-type display apparatus according to claim 1, wherein said light intensity uniformizing element is composed of a transparent rectangular columnar member, and is configured to reflect a light flux in said rectangular columnar member.

11. The projection-type display apparatus according to claim 1, wherein said light intensity uniformizing element is composed of a lens array including a plurality of lens elements arranged in a plane.

12. The projection-type display apparatus according to claim 3, wherein a light ray proceeding through a center of a light flux from rectangular image forming area of said reflection-type light valve to said projection optical system is inclined with respect to a normal line of said image forming area of said reflection-type light valve,
 wherein a shifting amount $S_P$ of said projection optical system with respect to said reflection-type light valve in a direction perpendicular to said projection optical axis of said projection optical system, and
 wherein a diameter E of an incident side opening of said opening defining member, an effective diameter $E_P$ of an incident surface of said projection optical system, and a dimension $V_d$ of said reflection-type light valve in a vertical scanning direction satisfy:

$E<E_P$, and $0.7\times V_d > S_P > 0.4\times V_d$.

13. The projection-type display apparatus according to claim 12, wherein $E_P/V_P > 2.15$ is further satisfied.

14. The projection-type display apparatus according to claim 12, wherein a focusing point of said illumination optical system is disposed on an exit surface side with respect to an incident surface of said projection-type optical system.

* * * * *